United States Patent [19]

Reh et al.

[11] 4,165,717

[45] Aug. 28, 1979

[54] PROCESS FOR BURNING CARBONACEOUS MATERIALS

[75] Inventors: Lothar Reh, Bergen-Enkheim; Martin Hirsch, Frankfurt am Main, both of Fed. Rep. of Germany; Per H. Collin, Falun; Sune N. Flink, Vaesteraas, both of Sweden

[73] Assignee: Metallgesellschaft Aktiengesellschaft, Frankfurt am Main, Fed. Rep. of Germany

[21] Appl. No.: 842,359

[22] Filed: Oct. 14, 1977

Related U.S. Application Data

[63] Continuation of Ser. No. 654,351, Feb. 2, 1976, abandoned.

[30] Foreign Application Priority Data

Sep. 5, 1975 [DE] Fed. Rep. of Germany ....... 2539546

[51] Int. Cl.² ................................................ F22B 1/02
[52] U.S. Cl. ................................. 122/4 D; 110/342; 431/7; 431/170
[58] Field of Search ................... 431/7, 170; 122/4 D; 23/288 K; 48/210; 201/31; 110/342

[56] References Cited

U.S. PATENT DOCUMENTS

| 3,625,164 | 12/1971 | Spector | 110/342 |
| 3,763,830 | 10/1973 | Ribinson et al. | 122/4 D |
| 3,859,963 | 1/1975 | Roberts et al. | 122/4 D |

*Primary Examiner*—Edward G. Favors
*Attorney, Agent, or Firm*—Karl F. Ross

[57] ABSTRACT

Carbonaceous material, preferably coal or like finely divided solids with a mean particle diameter of 30 to 250 microns, is burned to produce steam in a fluid-bed furnace having a lower free space without internal fixtures and provided above this free space with internal cooling surfaces. A secondary-gas inlet introduces the secondary gas so that the volume ratio of fluidizing gas to secondary gas ranges from 1:20 to 2:1 at a location above the fluidizing-gas and fuel inlets but below the internal cooling surfaces, the gas velocity of the several gases being adjusted so that the mean suspension density of the solids above the secondary-gas inlet is 15 to 100 kg/m³. Approximately stoidiometric conditions are maintained with respect to the oxygen in the gases introduced and the carbonaceous material and solids are recycled to the bed after being separated from the gases emanating therefrom.

20 Claims, 4 Drawing Figures

PROCESS FOR BURNING CARBONACEOUS MATERIALS

This is a continuation of application Ser. No. 654,351, filed Feb. 2, 1976, abandoned.

FIELD OF THE INVENTION

This invention relates to a process for burning carbonaceous materials under approximately stoichiometric conditions in a fluid bed, wherein the discharged solids are recycled to the fluid bed and heat of combustion is dissipated through cooling surfaces.

BACKGROUND OF THE INVENTION

Numerous systems have already been used to burn carbonaceous materials. It is known, inter alia, to use for this purpose fluidized-bed reactors operated as described hereinbefore (see British Patent Specification No. 784,595 and articles by J. R. GRACE, "Fluidization and its Application to Coal Treatment and Allied Processes", AICHE Symposium Series 141, Vol. 70 (1974), pp. 21-26, and D. L. KEAIRNS et al, "Design of a Fluidized Bed Combustion Boiler for Industrial Steam Generation", AICHE Symposium Series 126, Vol. 68 (1972), pp. 259-266).

The known processes have the disadvantages that the height of the bed must be comparatively low so that the pressure loss is kept within reasonable limits, that the presence of cooling surfaces in the lower part of reactor space involves a disturbance of the transverse mixing of the solids in the fluidized bed so that the inhomogeneities of temperature (overheating, formation of crusts) occur, and that the operation of the reactor cannot be satisfactorily adapted to varying power requirements. An adaptation can be effected virtually only by a decrease in temperature although this involves poorer combustion and fluidization conditions, or by a shutdown of individual reactor units.

OBJECTS OF THE INVENTION

It is an object of the invention to provide a process in which the known disadvantages, particularly those mentioned hereinbefore, are avoided.

A further object of the invention is to provide a process which can be carried out with minimum structural expenditure, with greater economy and without the disadvantages of the earlier systems mentioned above.

Another object of the invention is to provide an improved fluid-bed combustion system especially for particulate carbonaceous materials with greater combustion load per reactor volume unit, low nitrogen oxide level in flue gases and improved ability to respond to varying power demands.

Still another object of the invention is to provide a combustion system for the purposes described which minimizes the level of noxious or toxic components in the flue gases.

It is also an object of the invention to provide an improved system for burning carbonaceous materials whose utilization in the past created problems with respect to temperature homogeneity.

SUMMARY OF THE INVENTION

In a process of the kind defined first hereinbefore, these objects are attained for the production of steam according to the invention by the combination of the following (a) combustion is carried out in the presence of oxygen-containing gases, which are supplied in two partial streams at different height levels of an upright fluid bed, and at least one of the partial streams is used as a combustion-promoting secondary gas and fed into the combustion chamber on one plane or a plurality of superposed planes;

(b) the volume ratio of fluidizing gas to secondary gas is adjusted to a value in the range of substantially 1:20 to 2:1;

(c) the gas velocity and the ratio of fluidizing gas to secondary gas are adjusted to provide above the secondary-gas inlet means a fluidized-bed condition having a mean suspension density of 15-100 kg/m$^3$;

(d) at least a substantial part of the heat of combustion is dissipated through cooling surfaces disposed in the free furnace space above the secondary-gas inlet means;

(e) a major part of the carbonaceous material is fed into the space which is disposed below the secondary gas inlet means and virtually free of internal fixtures; and (f) solids are withdrawn from the circulation system which comprises the fluid-bed reactor, separator, and recycle conduit.

More generally, the invention comprises a process for burning carbonaceous material in which the carbonaceous materials, preferably in a particle size range of 30 to 250 microns, is introduced into a vertically elongated (upright) fluid-bed chamber and is fluidized therein with oxygen-containing gases including a primary fluidizing gas stream introduced at a lower point in the bed and a secondary gas stream introduced at least at one point above the point of introduction of the primary fluidizing gas and the carbonaceous material.

The solids are carried with the flue gases from the bed by entrainment and are separated from the flue gases in a single or multistage separation system, being recycled from the top of the reactor chamber at least in part to a lower portion of the bed above the secondary-gas inlet.

This lower portion of the bed is, according to an advantageous feature of the invention, free from internal fixtures as noted above, including any cooling surface which might obstruct an undisturbed movement of the solids and gases of the bed at least from the point of introduction of the primary fluidizing gas (bottom of the bed) to a point at a safe distance from the secondary-gas inlet. Such lack of interference with lateral solids admission and with the initial mixing gases and solids has been found to be essential to a satisfactory practice of the invention.

It is also important and indeed critical to the present invention that conduits forming internal cooling surfaces within the column or shaft of the bed be provided in a combustion space above the point of reintroduction of the recycled solids whose heat is therefore continuously transferred to a cooling fluid in the conduits, these surfaces being generally in the form of upright fluid-cooled walls.

We consider it important, furthermore, to control the gas velocities and volumes, especially the ratio of fluidizing gas to secondary gas, so as to maintain above the secondary gas inlet a fluidized bed with a mean solids suspension density of 15-100 kg/m$^3$. We have found that deviations from the range result in sharp reductions of heat transfer rates at lower values and increases in energy consumption for higher values leading to a loss of efficiency at either end.

From an orthodox fluidized bed, which comprises a dense phase that is separated from the overlying gas space by a distinct step in density, the fluidized bed used in accordance with the invention differs in that it involves states of distribution which lack a defined boundary layer. There is no drastic change in density between a dense phase and an overlying dust-containing space but the concentration of solids in the reactor decreases continuously in an upward direction to the place at which the solids are entrained out of the reactor in a gas stream.

When the operating conditions are defined by means of the Froude and Archimedes number, the following ranges are obtained:

$$0.1 < \mathbf{1} \times \frac{u^2}{g \times d_k} \times \frac{P_g}{P_k - P_g} < 10$$

and $$0.01 < Ar < 100$$

where $$Ar = \frac{d_k^3 \times g(P_k - P_g)}{P_g \times y^2}$$

In the above relations:
u relative gas velocity in m/sec; u=
Ar=Archimedes number;
$P_g$=density of the gas in kg/m$^3$.
$P_k$=density of the solid particles in kg/m$^3$;
$d_k$=diameter of the spherical particles in m;
y=kinematic viscosity in m$^2$/sec;
g=constant of gravitation in m/sec.$^2$.

Because all oxygen-containing gases required for the combustion are divided into at least two partial streams which are supplied on different levels, the combustion is effected in two stages. Because of the substochiometric combustion in a first lower zone and an afterburning in a second higher zone, there results a "soft" combustion, which eliminates local overheating so that formation of crusts or clogging is avoided and the formation of nitrogen oxide is limited to values below 100 ppm.

Because internal blockages in the lower reactor space, below the secondary-gas inlet means, are avoided as far as possible, a good distribution of the fed carbonaceous material is instantaneously effected. The rapid mixing with the hot bed material ensures good degasification and ignition of the fuel.

If the carbonaceous material is fed in a fine-grained state, e.g. with a mean particle diameter of 30–250μ it has a large surface area so that short reaction times are made possible.

It should be noted that the mean particle diameter of 30–250 microns applies principally to fine-grain solid carbonaceous materials which have been found to be particularly suitable for use with the present invention.

The combustion may be carried out in a fluid-bed reactor which is rectangular, square, or circular in cross-section. The lower part of the fluid-bed reactor may be downwardly tapered, e.g. conical; this is particularly desirable with reactors which are large in cross-section or wherein an inert fluidizing gas is used.

Under atmospheric pressure, the gas velocities in the fluid-bed reactor above the secondary gas inlet means are usually above 5 m/sec. and may be as high as 15 m/sec.

The ratio of the diameter to the height of the fluid-bed reactor should be such that gas residence times of 0.5–8.0 sec., preferably 1–4 sec., are obtained.

The latter parameters are not critical in the sense that deviations from these ranges would make the system inoperative or pose an environmental hazard. However, it has been found that a residence time of 0.5–8.0 seconds for the gas traversing the fluid-bed reactor should be maintained for optimum results. If the residence time is greater or less than this range, the system remains operative although various economic disadvantages arise.

The fluidizing gas may consist of virtually any desired gas which will not adversely affect the quality of the exhaust gas. Suitable gases are, e.g., inert gases such as recycled flue gas (exhaust gas), nitrogen, and water vapor. To increase the combustion rate, it will be desirable to supply the reactor with a fluidizing gas consisting of a partial stream of the oxygen-containing gases required.

In view of the above, the process can be carried out in the following ways:

1. An inert gas is used as a fluidizing gas. In this case the oxygen-containing combustion gas used as secondary gas must be charged in at least two superimposed planes.

2. Oxygen-containing gas is used as a fluidizing gas. In this case it is sufficient to feed secondary gas in one plane, although the secondary gas also can be fed in a plurality of planes in this embodiment.

A plurality of secondary-gas inlet openings are preferably provided in each feeding plane.

According to a preferred feature of the invention, the secondary gas is fed on a level which is up to 30% of the total height of the fluid-bed reactor, and at least 1 m, over the fuidizing-gas inlet. If in this case the secondary gas is fed in a plurality of planes, the above level refers to the level of the uppermost secondary-gas inlet. The feeding on this level ensures that there is a sufficiently large space for the first combustion stage, so that the reaction of the carbonaceous material and the oxygen-containing gas is almost complete in this stage—whether the oxygen-containing gas is supplied as fluidized gas or as secondary gas in a lower plane——and enables the accommodation of sufficiently large cooling surfaces in the upper reaction space disposed over the secondary-gas inlet means.

The cooling surface area can be further increased if, in accordance with another preferred feature of the invention, additional cooling surfaces are installed on the wall of the fluid-bed reactor. These cooling surfaces may cover also the wall of the lower part of the reactor because this will not adversely affect the mixing of solids. The wall itself may constitute a cooling surface.

The cooling surfaces consist generally of rectangular tube plates, which are cooled by a force-fed fluid and are spaced at least 150 mm, preferablly 250–500 mm, apart. Such cooling surfaces are used also in cooling walls. The axes of the tubes should be parallel to the direction of flow of the gas-solids suspension because this results in a minimum of erosion. Whereas this yields a slightly lower heat transfer per unit of cooling surface area than an arrangement of tubes having a horizontal axis, which is at right angles to the direction of flow, the smaller heat transfer is not significant because the process according to the invention permits of an accommodation of large cooling surfaces in the fluid-bed reactor and, if desired, in the succeeding separating and recycling unit.

If the carbonaceous materials have only a low content of incombustibles, it is not economical to utilize their sensible heat after their withdrawal from the circulating system comprising the fluid-bed reactor, the separator, and the recycle conduit. On the other hand, if the content of incombustibles is high, the heat content will advantageously be utilized. To this end, the solids may be cooled in a fluidized-bed cooler. An improved heat balance can be obtained if, in accordance with a preferred feature of the invention, the solids are cooled in a fluidized-bed cooler which preferably comprises a plurality of chambers flown through in succession, and in which gas serving as a fluidizing medium and/or secondary gas in the fluid-bed reactor is heated, so that the heat content of the solids is returned to the combustion process.

It will also be desirable to extract heat from the exhaust gas from the fluid-bed reactor used for the combustion. To this end conventional steam-boiler technology for waste-heat recovery may be adopted or, in a particularly desirable manner, the exhaust gas may be fed as fluidizing gas to a fluidized-bed cooler. The fluidized-bed cooler may be of the Venturi type and may be rectangular square or circular in cross-section and may consist of tube plates. Heat may alternatively be exchanged with a coolant flowing in tube bundles. Water is most advantageously used as a coolant because the water is thus heated and is then fed to the cooling surfaces of the fluid-bed reactor used for the combustion and is evaporated and/or superheated there.

To minimize the sulfur content of the exhaust gas, the combustion process is preferably carried out in the presence of fine-grained desulfurizing agents such as lime, dolomite and the like. The desulfurizing agents should have approximately the same particle size as the solid carbonaceous material and are simply fed jointly with the latter or are introduced separately into the fluid-bed reactor. For a reactor having given dimensions, the capacity can be increased in accordance with a further preferred feature of the invention in that the combustion process is carried out with oxygen-enriched air rather than with ordinary air and/or under superatmospheric pressure, preferably up to 20 kg/cm$^2$ gauge.

In this case the cooling surface area must be larger than for an operation with ordinary air and/or under atmospheric pressure. This may be accomplished, e.g., by the installation of additional cooling registers in the furnace space above the secondary-gas inlet means.

If oxygen-enriched air is used, the density of the suspension in the reactor space above the secondary-gas inlet means should lie in the upper part of the range from 15 to 100 kg/m$^3$ because the heat flow densities are higher and higher solids concentrations yield higher coefficients of heat transfer.

The main advantage of the process according to the invention resides in that it can be adapted in a very simple manner to the power requirement, which varies substantially in practice. According to a preferred feature of the invention this is accomplished in that the combustion rate is controlled by a control of the density of the suspension in that part of the furnace space of the fluid-bed reactor which is disposed above the secondary-gas inlet means.

Given operating conditions, including given fluidizing-gas and secondary-gas volume rates and a given resulting mean average density of the suspension, are accompanied by a distinct coefficient of heat transfer at the cooling surfaces. The heat transfer will be increased if the density of the suspension is increased by an increase of the fluidizing-gas rate and, if desired, the secondary-gas rate. At a virtually constant combustion temperature in the whole cycle, the increased heat transfer enables the dissipation of the heat at the rate which corresponds to the higher combustion rate. The higher oxygen requirement which is due to the higher combustion rate is virtually automatically met by the fact that the fluidizing gas and, if desired, the secondary gas are fed at higher rates to increase the density of the suspension.

For an adaption to a lower power requirement, the combustion rate can be controlled by a decrease of the density of the suspension in that part of the furnace space of the fluid-bed reactor which is disposed above the secondary-gas inlet. The decrease of the density of the suspension results in a decrease of the heat transfer so that less heat is dissipated from the fluid-bed reactor and the combustion rate can be decreased substantially without a decrease in temperature.

The carbonaceous material is fed in the conventional manner, advantageously through a single lance or a plurality of lances and preferably by pneumatic blowing. Owing to the good lateral solids introduction, a relatively small number of lances are sufficient and in fluid-bed reactors having small dimensions even a single lance will suffice.

The solid combustion residues entrained by the exhaust gases from the fluid-bed reactor are recycled by means of cyclone separators or baffles or impingement separators in which the gas stream is deflected. The walls of the recycling means are provided, if desired, with cooling surfaces which are preferably approached by parallel flows.

The final purification of the gases may be accomplished in a conventional way, e.g., by means of an electrostatic precipitator. The solids which are thus collected may be recycled into the fluid-bed reactor to minimize the carbon content.

The process according to the invention is particularly suitable for the combustion of coal of any kind, of coal-washing refuse, retort residue, oil shale, fuel oil and mixtures thereof. Where fuel oil is used as the carbonaceous material, a bed material is required which consists, e.g. of fine-grained lime or dolomite or other mineral substances having particle sizes in the range of about 30–250 microns.

The essential advantage afforded by the process according to the invention resides in that the temperature throughout the circulation system comprising the fluid-bed reactor, separator, and recycling means is more constant than in any previous processes of burning carbonaceous material. The intense motion of solids precludes temperature gradients so that an overheating of individual solid particles is avoided.

In the preferred embodiment of the process, comprising the addition of desulfurizing agents, the fact that temperatures are constant has a beneficial effect also on the desulfurization efficiency of the exhaust gases. As a result of the constant temperatures, the desulfurizing agents retain their activity and their capacity to take up sulfur and low stoichiometric ratios of Ca:S (less than 2) are needed.

This advantage is enhanced by the small particle size of the desulfurizing agent because the sulfur-combining velocity depends mainly on the diffusion velocity and is particularly promoted by the existing relation of surface area to volume.

The process according to the invention also enables a complete combustion of the carbonaceous material. In the preferred embodiment of the invention with oxygen rates only slightly above the stoichiometric requirement, e.g. not above an excess of 30% and preferably not above 10%, such results are obtained.

BRIEF DESCRIPTION OF THE DRAWING

The invention will now be explained more fully and by way of example with reference to the accompanying drawing and the Examples. In the drawing.

SPECIFIC DESCRIPTION

Figure 1:
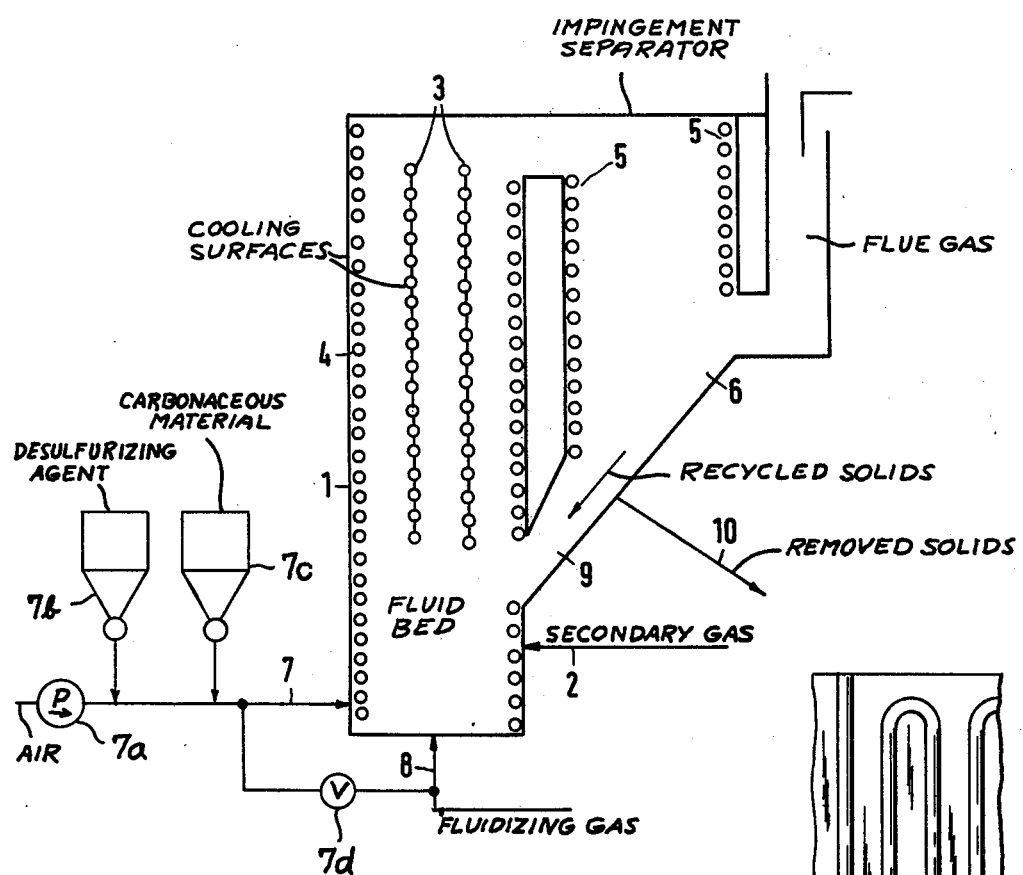
FIG. 1 is a diagrammatic sectional view showing a fluid-bed reactor having prismatic having a space.

A fluid-bed reactor 1 is provided with cooling surfaces 3 disposed in a combustion space above a secondary-gas inlet 2. Additional cooling surfaces 4 and 5 are disposed on the wall of the fluid-bed reactor 1 and of a separator 6, which is structurally combined with the fluid-bed reactor 1. To show the arrangement of the cooling surfaces more clearly, the several tubes have a horizontal orientation, which differs from the preferred embodiment in which the tubes run vertically (see FIG. 4).

In operation, the fluid-bed reactor 1 is fed with carbonaceous material through a lance 7, with fluidizing gas through an inlet 8, and with secondary gas through inlet 2. A relatively dense fluidized bed is disposed between the secondary-gas inlet 2 and the fluidizing-gas inlet 8 and has a density of suspension which may attain a value as high as the bulk density of the bed material. The mean density of the suspension above the secondary-gas inlet 2 is 15–100 kg/m$^3$. Lance 7 and inlet 8 constitute first inlet means while inlet 2 represents a second inlet means.

The solids entrained by the exhaust gas from the fluid-bed reactor 1 are collected from the exhaust gas in the separator 6 and are recycled through re-entry port 9 into the fluid-bed reactor 1 for renewed contact with cooling surfaces 3–5 in the combustion space. The surplus solids produced are withdrawn through a conduit 10.

Figure 2:
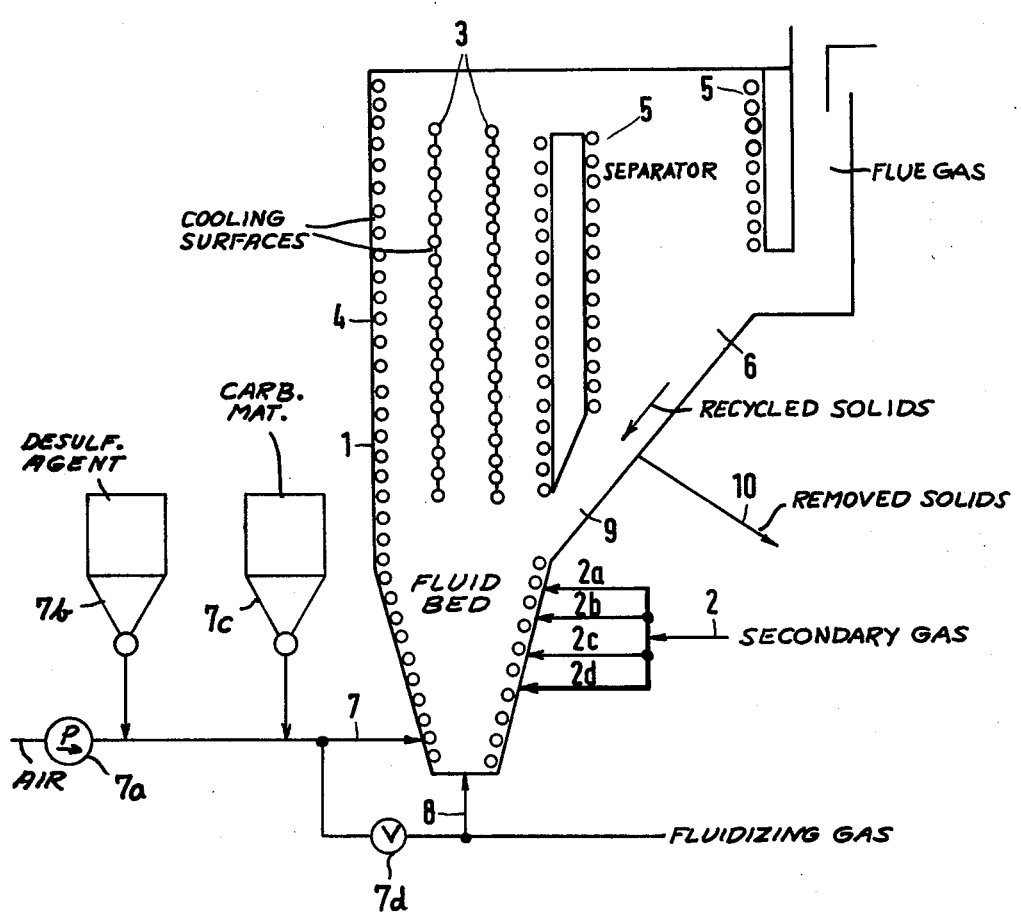
FIG. 2 is a diagrammatic sectional view showing a fluid-bed reactor having a cylindrical reactor space which has a conical lower part.

The fluid-bed reactor shown in FIG. 2 has a frustoconical lower portion. In this case, secondary gas is fed through inlets 2a, 2b, and 2c, 2d disposed on different levels. The other reference characters are the same as in FIG. 1.

Figure 3:
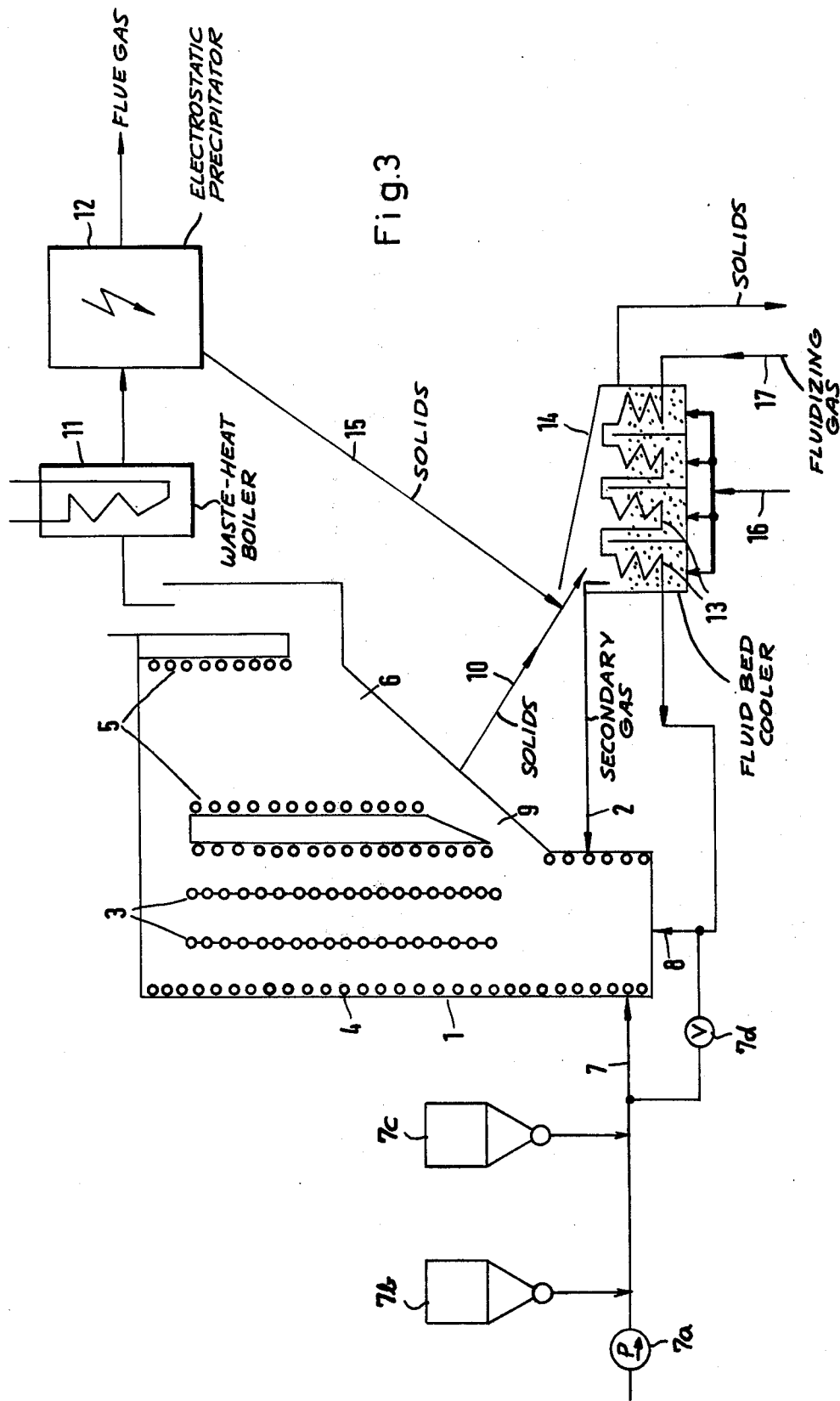
FIG. 3 is a diagrammatical sectional view showing the fluid-bed reactor of FIG. 1 and the equipment connected thereto.

In the embodiment shown in FIG. 3, the arrangement shown in FIG. 1 is succeeded in the exhaust-gas path by a waste-heat boiler 11 and an electrostatic precipitator 12. A fluidized-bed cooler 14 provided with cooling registers 13 serves to cool the solids discharged through conduit 10.

In the waste-heat boiler 11, designed as a fluidized-bed cooler, additional sensible heat is extracted from the exhaust gas leaving the separator 6 of the fluid-bed reactor. A fine purification of the exhaust gas is effected in the electrostatic precipitator 12. Solids which are thus collected are conducted in a conduit 15 and combined with the solids discharged through conduit 10. The combined solids are then fed to the fluidized-bed cooler 14.

The fluidized-bed cooler 14 comprises four chambers, which are traversed in succession, and is supplied with oxygen-containing fluidizing gas through a conduit 16. The gas is collected in the hood and is fed through inlet 2 as secondary gas to the fluid-bed reactor 1. By the cooling registers 13, the solids are indirectly cooled with a gas which is supplied through a conduit 17 and which may contain oxygen, if desired. Except for a partial stream, the gas leaving the cooling registers 13 is supplied through conduit 8 as fluidizing gas to the fluid-bed reactor 1. A branched-off partial stream is used for pneumatically feeding the carbonaceous material through lance 7.

Figure 4:
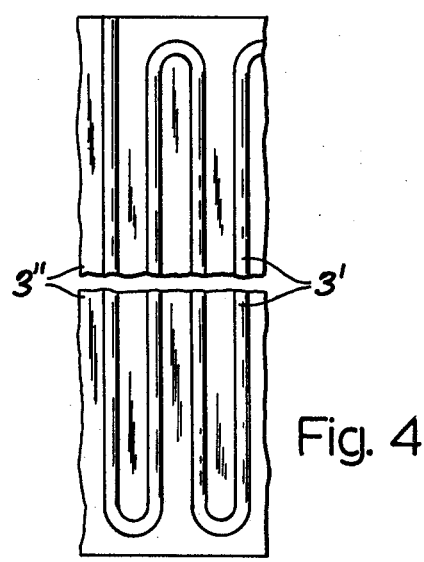
FIG. 4 is a detail view of the preferred cooling surfaces of the reactor of FIG. 1.

In FIG. 4 we show the preferred orientation of the cooling surfaces 3″ which extend vertically and are formed with vertical passes 3′ of cooling tubes. The coolant is preferably steam which can be maintained under pressure (superheated steam). In FIGS. 1–3 the feed line 7 for the carbonaceous material is shown to be provided with a blower 7a through which air or some other carrier gas can be introduced and which entrains particles of a desulfurizing agent from a dispenser 7b and particles of a carbonaceous material from a dispenser 7c. A valve 7d permits a portion of the primary fluidizing gas to be used as part of the carrier gas or allows part of the carbonaceous material or the carrier gas to be introduced at the bottom of the fluid bed.

EXAMPLE 1 (with reference to FIG. 1)

Coal was burned with air. The fluid-bed reactor 1 used for this purpose had a base area of 1×1 m and a height of 12 m. The reactor was provided throughout its inside wall with a cooling surface 4 having an area of 60 m$^2$. Besides, the reactor space contained plane vertical cooling surfaces 3 with an additional surface area of 27 m$^2$ disposed above the secondary-gas inlet 2. The fuel lance 7 was disposed 0.2 m above a bottom grate overlying the inlet 8 while the secondary-gas inlet 2 was disposed 2.5 m above the grate.

Coal having a calorific value $H_u$=7170 kcal/kg (=30.0 MJ/kg) and a mean average particle diameter of 0.1 mm was pneumatically fed in at a rate of 1 metric ton/h by means of air flowing at a rate of 150 standard m$^3$/h. The fluid-bed reactor 1 was fed through the grate with 4000 standard m$^3$/h air at 300° C. and through inlet 2 with 4300 standard m$^3$/h air at 300° C. The mean density of the suspension in the reaction space was 300 kg/m$^3$ below the secondary-gas inlet 2 and 50 kg/m$^3$ above the inlet. The temperature throughout the circulation system was about 850° C.

The combustion residues were collected from the exhaust gas in the separator 6 and were recycled into the fluid-bed reactor 1. A partial system was discharged at 10 and so controlled that the amount of residues recycled per hour was five times the amount of solids contained in the fluid-bed reactor.

Under the above-mentioned process conditions, coefficients of heat transfer amounting to 120 watts/m$^2$×°C. were obtained. Of the total heat supplied at a rate of 9.2×10$^6$ watts, heat at a rate of 5.8×10$^6$ watts was dissipated through the cooling surfaces and used to generate saturated steam at 60 bars. The utilization of the fuel was 99%. The CO content in the exhaust gas was less than 0.1%.

EXAMPLE 2 (with reference to FIG. 1)

Coal was burned with oxygen-enriched air. The fluid-bed reactor 1 described in Example 1 was used for this purpose. In that reactor the area of the cooling surfaces disposed in the upper reactor space had been increased to 37 m². Besides, additional cooling surfaces having an area of 15 m² had been installed in the separator 6 on the walls thereof.

During operation under full load, coal having a calorific value $H_u = 7170$ kcal/kg and a mean particle diameter of 0.1 mm was pneumatically fed in at a rate of 2.7 metric tons/h by means of 300 standard m³/h oxygen-containing gas, which contained 60% by volume oxygen and was at 300° C. The density of the suspension was about 300 kg/m³ in the reactor space below the secondary-gas inlet 2 and about 90 kg/m³ in the reactor space above the secondary-gas inlet 2. The temperature throughout the circulation system was about 850° C. The solids collected from the exhaust gas in the separator 6 were recycled to the fluid-bed reactor 1 at such a rate that the amount of solids recycled per hour was eight times the solids content of the reactor. The remainder was discharged through conduit 10.

The coefficients of heat transfer obtained under these conditions amounted to 290 watts/m²×°C. Of the total heat supplied ($23.4 \times 10^6$), heat corresponding to $18.7 \times 10^6$ watts was dissipated through cooling surfaces and used to generate saturated steam at 60 bars.

Owing to a reduced power requirement, it was desired to operate the plant at one-third of the steam-generation rate. Whereas the fluid-bed reactor 1 and the installed cooling surfaces 4 and 5 were not changed, the coal-feeding rate was reduced to 0.9 metric ton/h. Coal was fed in through lance 7 by means of 100 standard m³/h air. The same fluidizing and secondary gases as described hereinbefore were introduced at reduced rates of 400 and 2200 standard m³/h, respectively.

Under the above-mentioned conditions, the concentration of solids was increased to about 530 kg/m³ in the lower reactor space and was decreased to about 30 kg/m³ in the upper reactor space. The coefficients of heat transfer were decreased to 100 watts/m²×°C.

It is apparent that an adaptation to the power requirement was accomplished by the mere change of the rates at which coal, fluidizing gas and secondary gas were fed in. The solids content throughout the fluid-bed reactor and the temperature of 850 (+10) °C. in the circulation system were not changed.

Only a very short time was required to run up the reactor to a higher power or to full load.

EXAMPLE 3 (with reference to FIG. 1)

Fuel was burned with air under superatmospheric pressure. For this purpose, the fluid-bed reactor 1 was used which has been described in Example 1 and had been provided with cooling surfaces having a total area of 132 m². 60 m² of said area were provided the inside wall of the reactor space, 25 m² on the walls of the separator 6, and 47 m² in the free reactor space disposed over the secondary-gas inlet 2. The fluid-bed reactor contained a sufficiently large amount of limestone as bed material.

Fuel oil having a calorific value of 9600 kcal/kg (=40.2 MJ/kg) and an S content of 3.2% by weight was fed in at a rate of 1.5 metric tons per hour through lance 7. Limestone which contained about 97% by weight $CaCO_3$ and had a mean particle diameter of about 0.1–0.2 mm was pneumatically fed in as a bed material and as sulfur-combining agent at a metered rate of 278 kg/h, corresponding to a molar ratio of 1.8 moles CaO per mole of sulfur in the fuel oil, by means of 50 standard m³/h air.

The fluid-bed reactor was bed through the grate with 10,500 standard m³/h air and through the secondary gas inlet 2 with 7000 standard m³/h air. The air in both streams was under a pressure of 5 bars and at a temperature of 300° C. A temperature of 850° C. was obtained in the circulation system. The withdrawal of solids through conduit 10 and the recycling of solids through conduit 9 were controlled so that the amount of solids recycled per hour was about eight times the solids content of the fluid-bed reactor.

Under these conditions of operation, the mean density of the suspension in the reactor space was 300 kg/m³ below the secondary-gas inlet 2 and 60 kg/m³ above the secondary-gas inlet 2. The coefficient of heat transfer was about 150 watts/m²×°C. Of the total heat supplied at a rate of $18.6 \times 10^6$ watts, heat at a rate of $11.4 \times 10^6$ watts was dissipated by the cooling surfaces formed by tubes and was utilized to generate saturated steam at 60 bars.

The utilization of the fuel amounts to 99%. The CO content in the exhaust gas was below 0.1% by volume and the $NO_x$ content below 100 ppm. A desulfurization of 90% was effected.

EXAMPLE 4 (with reference to FIG. 3)

Coal-washing refuse was burned with oxygen-enriched air. For this purpose, the fluid-bed reactor 1 ws used which has been described in Example 1 and which had been provided with cooling surfaces of 60 m² area on its inside wall, of 58 m² area in the upper reactor space and of 25 m² area in the separator 6.

Coal-washing refuse containing 67% by weight ash, with a combustible content of 30% by weight, a moisture content of 3% by weight, a mean particle size of 0.08 mm, and a calorific value of 2000 kcal/kg (=8.4 Mj/kg), was fed in through lance 7 at a rate of 9.1 metric tons/h by means of 1000 standard m³/h conveying gas, which had an oxygen content of 60% by volume and a temperature of 450° C. The reactor was fed through the grate with 4000 standard m³/h fluidizing gas and through the secondary gas inlet 2 with 2700 standard m³/h secondary gas. Each of said gas streams had an oxygen content of 60% by volume and a temperature of 450° C.

The mean density of the suspension amounted to about 250 kg/m³ below the secondary-gas inlet 2 and to about 70 kg/m³ above the secondary-gas inlet 2.

Ash was recycled at such a rate that ten times the reactor content was recycled per hour. The remainder was discharged through conduit 10. The temperature throughout the circulation system was about 850° C.

The hot incombustible residue discharged through conduit 10 was fed to a fluidized-bed cooler 14, which comprised four chambers and interconnected cooling registers 13 reaching into the several chambers. The fluidizing gas flowing at a rate of 2700 standard m³/h had an oxygen content of 60% by volume and the indirect coolant flowing at a rate of 500 standard m³/h consisted of a gas having the same composition. These gases were heated to 450° C. and were supplied to the fluid-bed reactor 1 as secondary gas, as a fluidizing gas and as a feeding gas.

The incombustible residue was discharged from the fluidized-bed cooler 14 at a temperature of 150° C. Under these conditions, coefficients of heat transfer amounting to 200 watts/m$^2$×°C. were obtained. Of the total heat supplied at the rate of 22.6×10$^6$ watts, heat at a rate of 16.6×10$^6$ watts was dissipated through the cooling surfaces and used to generate saturated steam at 60 bars.

We claim:

1. A process for burning a carbonaceous material to provide steam which comprises the steps of:
   introducing carbonaceous material into a fluid bed in an upright reactor;
   fluidizing the carbonaceous material in said fluid bed with a primary fluidizing gas introduced at the bottom of said bed and a secondary gas introduced into said fluid bed at a level above that at which the primary gas is introduced and above the bottom of the fluid bed, at least the secondary gas containing oxygen;
   burning the carbonaceous material with the oxygen;
   maintaining the supply of carbonaceous material and oxygen to said fluid bed at distinct proportions;
   maintaining the volume ratio of fluidizing gas to secondary gas at substantially 1:20 to 2:1;
   controlling the velocity and the volume ratio of said gases to maintain the solids density above the location at which said secondary gas is introduced at substantially 15 to 100 kg/m$^3$ and with said density decreasing continuously over substantially the entire height of the reactor;
   removing thermal energy from said fluid bed by disposing therein, at a level above the location at which said secondary gas is introduced, cooling surfaces in contact with the solids of said fluid bed;
   cooling said surfaces with water to produce steam;
   maintaining, below the level at which the secondary gas is introduced, a space substantially free of internal obstructions at which said carbonaceous material is introduced;
   separating solids from the gas effluent from said bed at the top thereof to collect solid particles;
   recycling said solid particles to said fluid bed at a lower portion thereof whereby said fluid bed and the means for separating and recycling said particles constitute a closed solids circuit; and
   removing excess solids from said circuit.

2. The process defined in claim 1 wherein said primary fluidizing gas contains oxygen.

3. The process defined in claim 1 wherein said carbonaceous material and said oxygen are supplied to said fluid bed in substantially stochiometric proportions.

4. The process defined in claim 1, further comprising the step of cooling solids withdrawn from said cycle in a fluidized-bed cooler in heat-exchanging relationship with one of said gases.

5. The process defined in claim 4 wherein said solids removed from said cycle are cooled by indirect heat exchange with said fluidizing-gas in said fluidized bed cooler.

6. The process defined in claim 4 wherein said solids removed from said cycle are cooled in direct heat exchange with said secondary gas in said fluidized-bed cooler.

7. The process defined in claim 1, further comprising the step of introducing into said fluid bed, during combustion of said carbonaceous material therein, a fine-grain desulfurizing agent.

8. The process defined in claim 1 wherein at least one of said gases is oxygen-enriched air.

9. The process defined in claim 1 wherein said fluid bed is maintained at a superatmospheric pressure during the combustion of said carbonaceous material therein.

10. The process defined in claim 9 wherein said superatmospheric pressure ranges up to 20 kg/cm$^2$ gauge.

11. The process defined in claim 1, further comprising the step of controlling the combustion of said material in accordance with the power requirements of heated fluid withdrawn from said surfaces by regulating the density of said solids in the fluid bed above the location of introduction of the secondary gas.

12. An apparatus for the combustion of a carbonaceous material, comprising:
   an upright vertically elongated fluid-bed chamber;
   means for introducing carbonaceous material into a lower portion of said chamber;
   first inlet means for introducing a fluidizing gas into said chamber at the bottom thereof;
   second inlet means for introducing a secondary gas into said chamber at least one meter above said first inlet means and at a level lying above said bottom by up to substantially 30% of the total height of said chamber, at least said secondary gas containing oxygen sustaining combustion within said chamber;
   discharge means for removing a flue gas entraining solid particles from the top of said chamber;
   conduit means for the circulation of a coolant forming cooling surfaces in a combustion space of said chamber above said second inlet means, said chamber having a substantially unobstructed space below said second inlet means; and
   a separator connected to said discharge means for removing said particles from said flue gas and recycling at least a portion of the removed particles to a re-entry port at a lower part of said combustion space for renewed contact with said cooling surfaces, said re-entry port lying above said second inlet means.

13. The apparatus defined in claim 12, further comprising means for introducing a desulfurizing agent in finely divided form into said chamber.

14. The apparatus defined in claim 12, further comprising a waste-heat boiler traversed by said flue gas downstream of said separator, and an electrostatic precipitator downstream of said waste-heat boiler.

15. The apparatus defined in claim 12, further comprising:
   a fluidized-bed cooler;
   means for removing recirculated particles from said separator and introducing same into said cooler;
   means for fluidizing the particles in said cooler with one of said gases prior to introducing same into said chamber; and
   means for passing the other of said gases in indirect heat-exchanging relation with the fluidized particles in said cooler prior to introducing said other of said gases into said chamber.

16. A method of operating an upright fluid-bed reactor provided with inlet means for a fluidizing gas and solid particles near its bottom, a secondary-gas inlet at an elevated level above said inlet means, a channel system in a combustion space above said level for the circulation of a liquid heat carrier, and external conduit means for the recycling of solids from said combustion space to a fluid bed overlying said inlet means with removal of excess solids to the outside, comprising the steps of:

admitting carbonaceous material as part of a mass containing solid particles with a mean particle diameter of substantially 30 to 250 microns together with a fluidizing gas through said inlet means into said reactor at a flow rate sufficient to build up a fluid bed on said bottom beyond the level of said secondary-gas inlet and fill said space with solids in heat-exchanging contact with the heat carrier circulating in said channel system;

admitting a combustion-promoting gas through said secondary-gas inlet into said combustion space, said gases having a combined oxygen content sufficient to burn said carbonaceous material inside the reactor; and controlling the feed rates of said gases and of said mass to generate a continuous circulation of solids through said combustion space and said external conduit means while maintaining in said combustion space a substantially constant operating temperature and a mean solids density between substantially 15 and 100 kg/m$^3$.

17. The method defined in claim 16 wherein said fluidizing gas and said combustion-promoting gas are admitted into the reactor at a volumetric ratio ranging between substantially 1:20 and 2:1.

18. The method defined in claim 16, comprising the further step of cooling the removed excess solids by heat exchange with one of said gases prior to admission of the latter into said reactor.

19. The method defined in claim 18 wherein said one of said gases is said fluidizing gas.

20. The method defined in claim 16 wherein said solids are recycled from said combustion space to said fluid bed at an hourly rate of several times the solids content of said reactor.

* * * * *